Sept. 12, 1967      E. M. CRANAGE      3,341,039

BALED HAY PICKUP AND UNLOAD TRUCK

Filed Aug. 24, 1965      2 Sheets-Sheet 1

INVENTOR
EVERETT M. CRANAGE

BY *Beale and Jones*

ATTORNEYS

Sept. 12, 1967 E. M. CRANAGE 3,341,039
BALED HAY PICKUP AND UNLOAD TRUCK
Filed Aug. 24, 1965 2 Sheets-Sheet 2
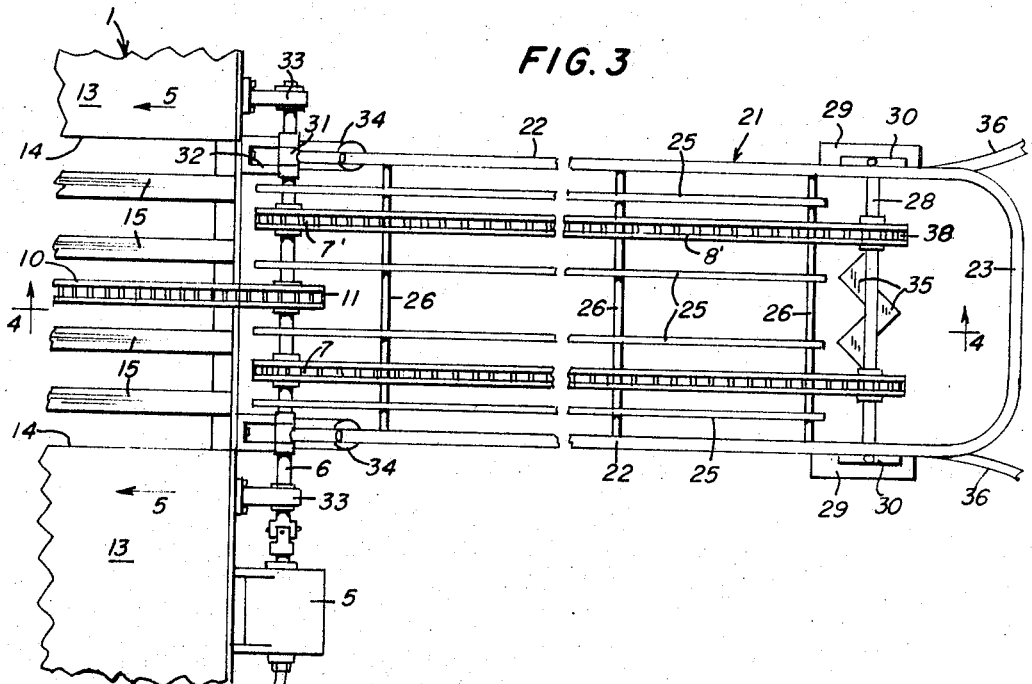
FIG. 3
FIG. 4
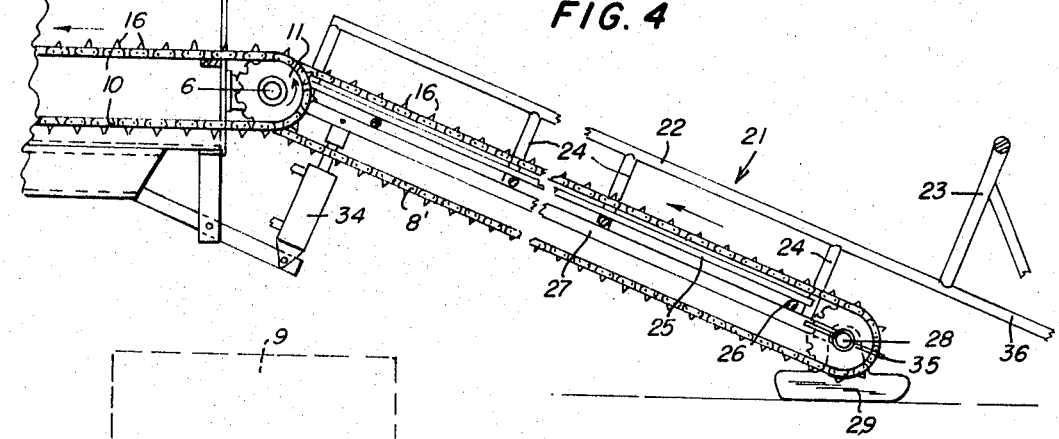
FIG. 5
INVENTOR
EVERETT M. CRANAGE
BY Beale and Jones
ATTORNEYS United States Patent Office 3,341,039
Patented Sept. 12, 1967

3,341,039
BALED HAY PICKUP AND UNLOAD TRUCK
Everett M. Cranage, Rte. 1, Box 150,
Deming, N. Mex. 88030
Filed Aug. 24, 1965, Ser. No. 482,077
2 Claims. (Cl. 214—83.26)

ABSTRACT OF THE DISCLOSURE

A front end baled hay pickup and unload self propelled truck having an endless conveyor extending forward from a pivotal attachment at the front end of the truck with a hydraulic piston and cylinder to elevate same. A power drive shaft forms the pivotal connection to which an endless conveyor is attached and driven which extends in a recessed skidway in the flat-bed of the truck, the skidway extending above and below the floor of the flat-bed truck and a hydraulic power take off from the truck drive motor to run the power drive shaft and the elevating piston and cylinder.

---

This invention relates to a baled hay or the like pickup and unload truck which is arranged to function to pickup bales of hay, or the like, and convey same in an upward direction and, thereafter, horizontally to position the bales upon a flat bed truck.

The primary object of this invention is to provide a combined bale pickup elevator associated with the truck which functions to feed the bales, in succession, to a second conveyor that can deposit the bales upon the floor of a flat-bed truck.

Another object is to provide a self powered mobile bale loader that has a common drive for a pivoted bale elevator which can deliver bales to a second conveyor that is movable parallel to the floor of a flat-bed truck.

Another object is to provide a truck wherein the driving engine is located at one end thereof and an operator's seat and controls are positioned adjacent to the opposite end of the truck whereby the operator is afforded a full view of the bale elevator to enable him to control same while controlling, also, the truck engine and steering.

Another object is to provide a flat-bed truck that has a bale receiving trough or skidway formed to extend through the truck floor to a point below this floor and into which bales can be fed from the bale elevator, said trough having a bale conveying chain and bale skid rods for permitting bales to be moved over the bottom of said trough.

A still further object is to provide a bale lifting conveyor hinged to be movable to an elevated position and a horizontal chain conveyor, both conveyors being driven by sprockets fixed to a driven shaft and an operator's seat and controls mounted adjacent to said shaft to afford a full view of the operator to his front and to his rear to ensure safety during fore or aft travel of the truck.

These and other objects which will hereafter be made apparent to those skilled in this art are accomplished by means of this invention one embodiment of which is described in the following specification and illustration in the accompanying drawings wherein:

FIG. 3 is a top plan view of the pivoted bale elevator.

FIG. 4 is a view, in cross section, taken on a vertical plane passing through section line 4—4 and in the direction of the arrows and, FIG. 5 is a view, in cross section, taken on a vertical plane passing through section line 5—5 and in the direction of the arrows.

Figure 1:
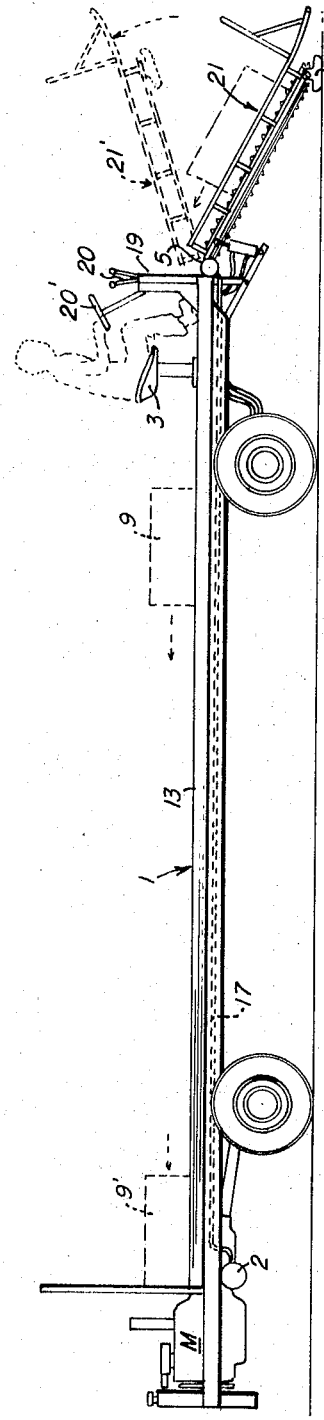
FIG. 1 shows in side elevation, the truck or tractor with an operator positioned adjacent to one end of a truck and in rear of a bale elevator and with the truck motor located at the other end of the truck.
Figure 2:
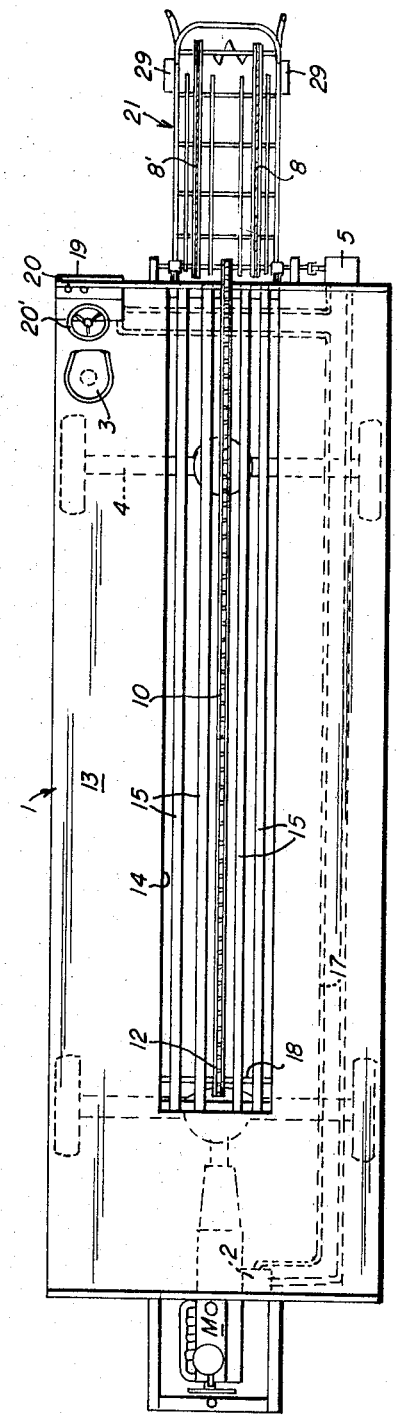
FIG. 2 is a top plan view, of the device shown by FIG. 1.

The pickup carrier and unloader constructed according to this specification comprises a flat-bed truck 1 that has a motor M located at one end thereof and which may be, say, of a common form of internal combustion engine. This motor drives a built in hydraulic pressure pump 2. An operator's seat 3 is positioned at the other end of this truck. The normally front axle 4 is steerable by the operator from seat 3. This arrangement avoids the use of an engine adjacent the operator's position and gives him a full view to observe all operations to be performed from his position. A reversible hydraulic motor 5 is used to drive a shaft 6 through sprockets 7, 7' and conveyor chains 8, 8' that are spaced amply to support a bale of hay 9, 9' or similar shape.

Intermediate said chains, preferably, a single conveyor chain 10 is driven by a sprocket 11 also mounted on said shaft and which extends horizontally towards said motor M and up to an idle sprocket 12 which defines the non-driven end of this single conveyor chain 10.

The flat floor 13 of the truck 1 has a guide recess or trough as at 14 to function as a guide for a bale of hay 9 or 9' which is to be moved along and through this trough 14. Skid bars 15 serve to slidably support the bale. All three chains are provided with teeth 16 that will dig into a bale to propel same fore or aft. As shown conventionally by dotted in lines, a pressure conduit 17 conducts hydraulic pressure to the hydraulic motor 5. The sprocket 12 is mounted on a shaft 18 that may revolve with the sprocket fixed thereto or this sprocket may be mounted to idle thereon.

Adjacent the operator's seat 3, a control casing 19 is mounted. This control is operably associated with the various controls necessary or desirable to operate or control the motor M or bale receiving elevator to be described and which controls may be for steering, clutch, brake, throttle, hydraulic motor employed to raise or lower said last named elevator or to mount the various gauges necessarily used. Said controls, or some of same, are indicated conventionally by numerals 20, 20'.

The foregoing novel combination of elements 1 through 20, 20' is associated with the truck body but they cooperate mutually with each other as well as with a bale elevator 21 that is pivotally connected to revolve around the chain drive shaft 6.

This elevator comprises a rigid framework formed by strong tubing preferably. An upper tube rail 22 serves to permit bales to slide therealong and the two rails 22 are bent to form an arcuate end 23 that is arcuate upwardly, also to permit bales to pass thereunder. Vertical tubes 24 connect the rails 22 to bottom members 25 and 26. The two outermost side rails 27 that are parallel to the members 25 are made relatively stronger than the members 25 to better support a shaft 28 and a pair of ground engaging skids 29 are pivotally hung from the ends of shaft 28 that extend outwardly beyond the shaft supporting members 27. These skids swing and compensate for uneven ground. A chain tightener 30 permits the shaft 28 to be moved fore or aft to adjust chain tension.

The end of member 27 adjacent to shaft 6 has a bearing 31 FIG. 3 that pivots around a pin in a bracket 32 secured to the truck. A pair of self aligning bearings 33 for shaft 6 is shown on FIG. 3. A hydraulic motor 34 serves to raise the elevator 21 in FIG. 1 to a position at 21' when not in use or to facilitate unloading at various levels. A series of teeth 35 on the shaft 28 are provided to dig into bales to feed same to the conveyor chains 8, 8'. The outwardly bent prongs 36 serve to guide a bale to the teeth 35. The chains 8, 8' run around a sprocket 38 fixed to the shaft 28. It will be seen that a bale guided by prongs 36 will be seized by the teeth 35 to be fed to the teeth 16 on all three chains and conveyed from chains 8, 8' to the chain 10. It will be noted, in FIG. 1, that the front wheels are steerable by means of the links 37.

In operation, the truck with the elevator conveyor 21 in an up position is moved to a bale where the elevator is lowered by the lift cylinder 34. A short forward movement of the truck permits the teeth 35 to engage a bale and feed same to the teeth 16 and to be conveyed, as shown in FIG. 1, to a position 9 and, finally, to a position 9'. The bales, thereafter, are moved by hand to be stacked upon the flat bed of the truck.

It should be noted that the bales are conveyed through a trough or skidway formed to extend above and below the floor of the flat-bed truck shown. The operator from the seat 3 will have a full view of the operation of the elevator 21 and his position at one side of this skidway with adjacent controls permits observance to the front and rear.

While a single embodiment of the invention has been shown and described, it is to be understood that there may be various embodiments within the limits of the prior art and the scope of the appended claims.

What is claimed is:

1. In a bale pickup and unloading truck, in combination, a flat-bed truck having a driving motor at one end thereof and an operator's position and associated controls at the other end thereof, a bale skidway extending longitudinally of and on the truck bed, said operator's position being displaced laterally at the skidway, a bale elevator pivotally mounted on said truck adjacent to the operator's position, a chain elevator and a driving means therefor for receiving bales, a reversible hydraulic motor operably connected to drive said driving means, said driving motor having a build-in hydraulic supply pump, a conduit extending from the pump to the hydraulic motor and a control member positioned within the reach of an operator for controlling operation of the hydraulic motor, said bale skidway having side and bottom members over which a bale may slide, said skidway being formed to extend through the truck bed to points above and below the floor of the truck.

2. In a device as set forth in claim 1, wherein the operator's position is displaced laterally of the skidway to afford a full view fore and aft and means for steering the front wheels of the truck at the operator's end thereof.

References Cited

UNITED STATES PATENTS

| 2,402,465 | 6/1946 | Templeton. |
| 2,418,726 | 4/1947 | Rogers _____ 214—522 |
| 3,199,604 | 8/1965 | Lorenzen at al. _____ 56—364 X |

FOREIGN PATENTS

| 920,510 | 3/1963 | Great Britain. |
| 84,190 | 7/1954 | Norway. |

GERALD M. FORLENZA, *Primary Examiner.*

ALBERT J. MAKAY, *Examiner.*